United States Patent Office 3,462,793
Patented Aug. 26, 1969

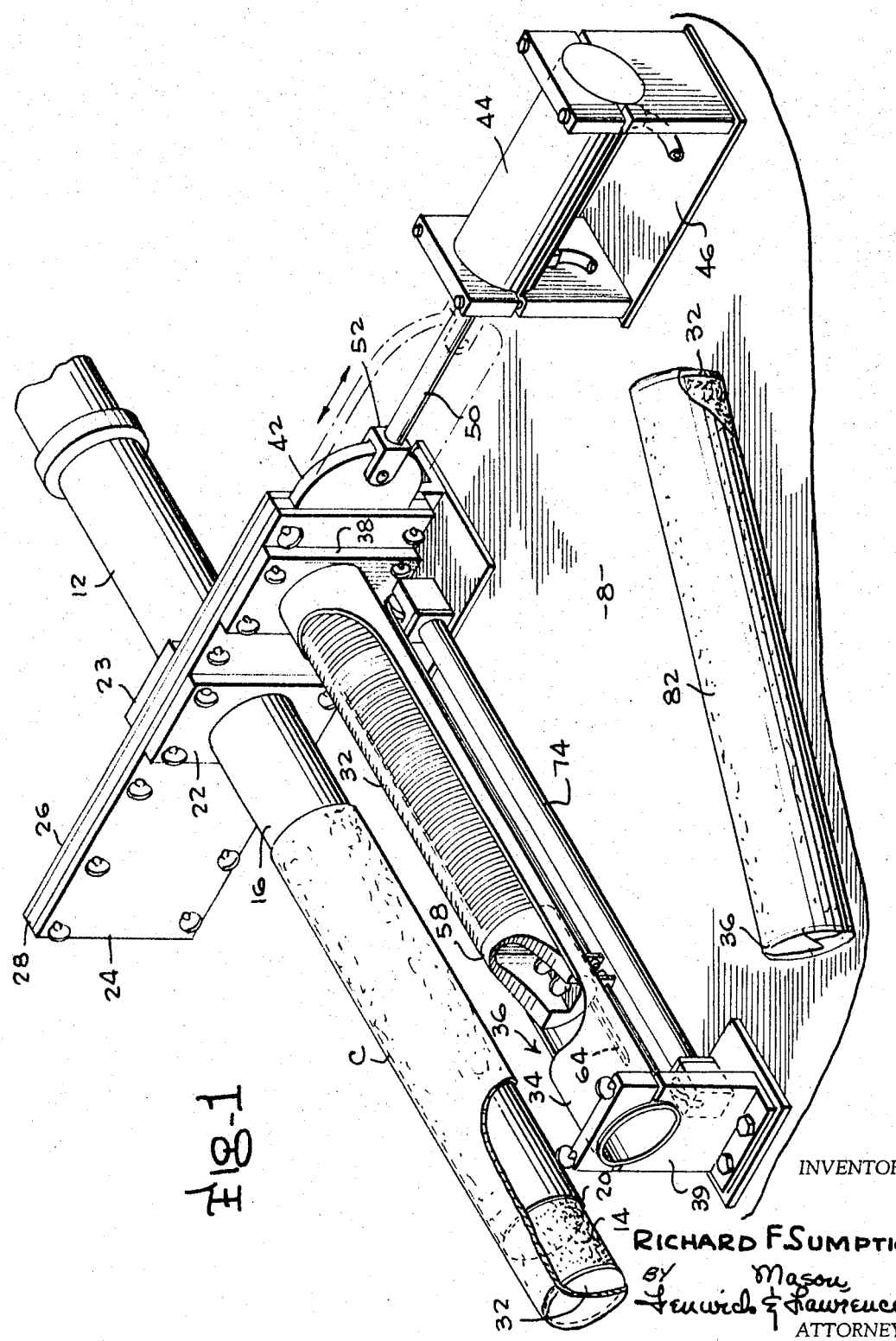

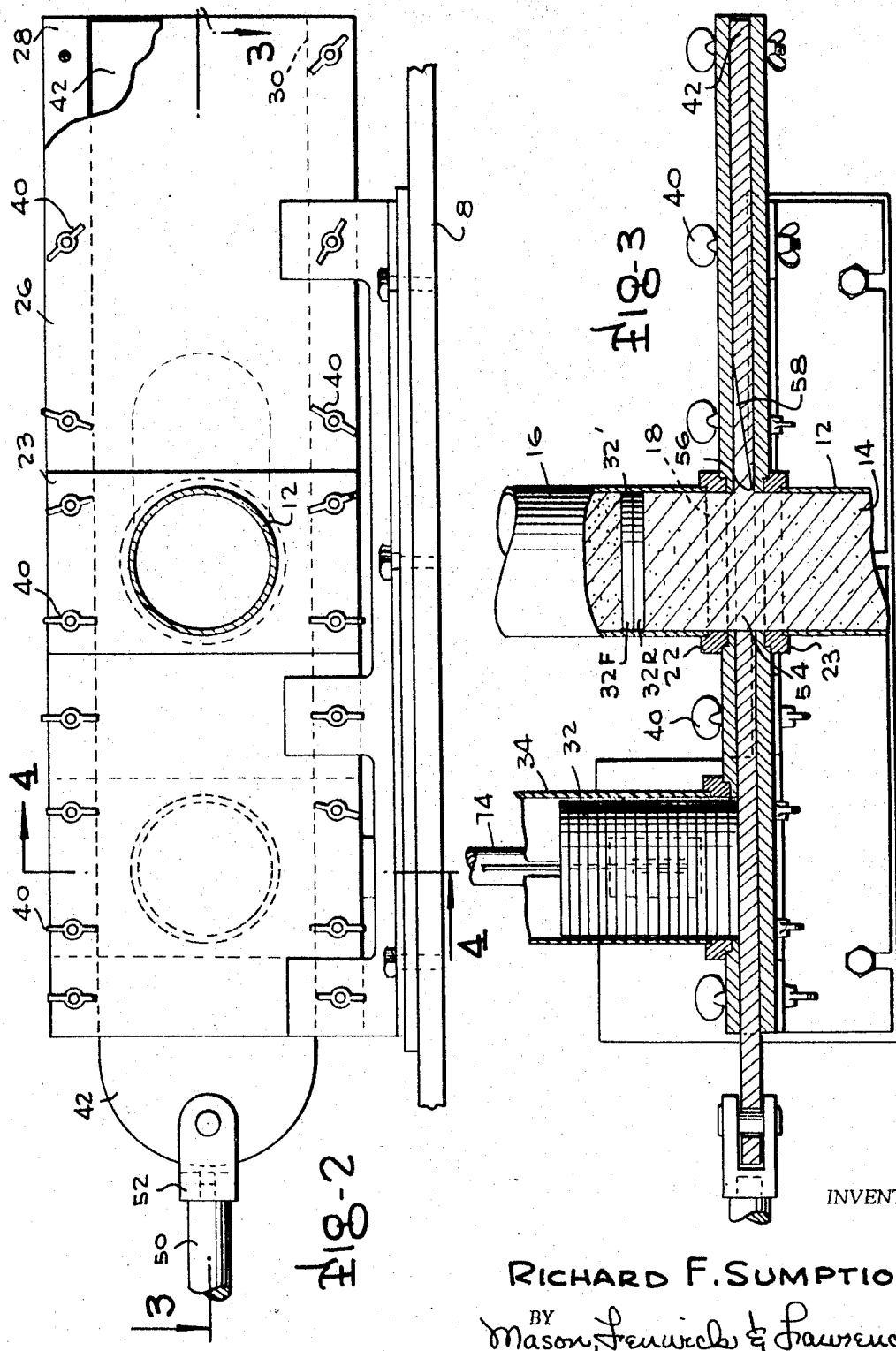

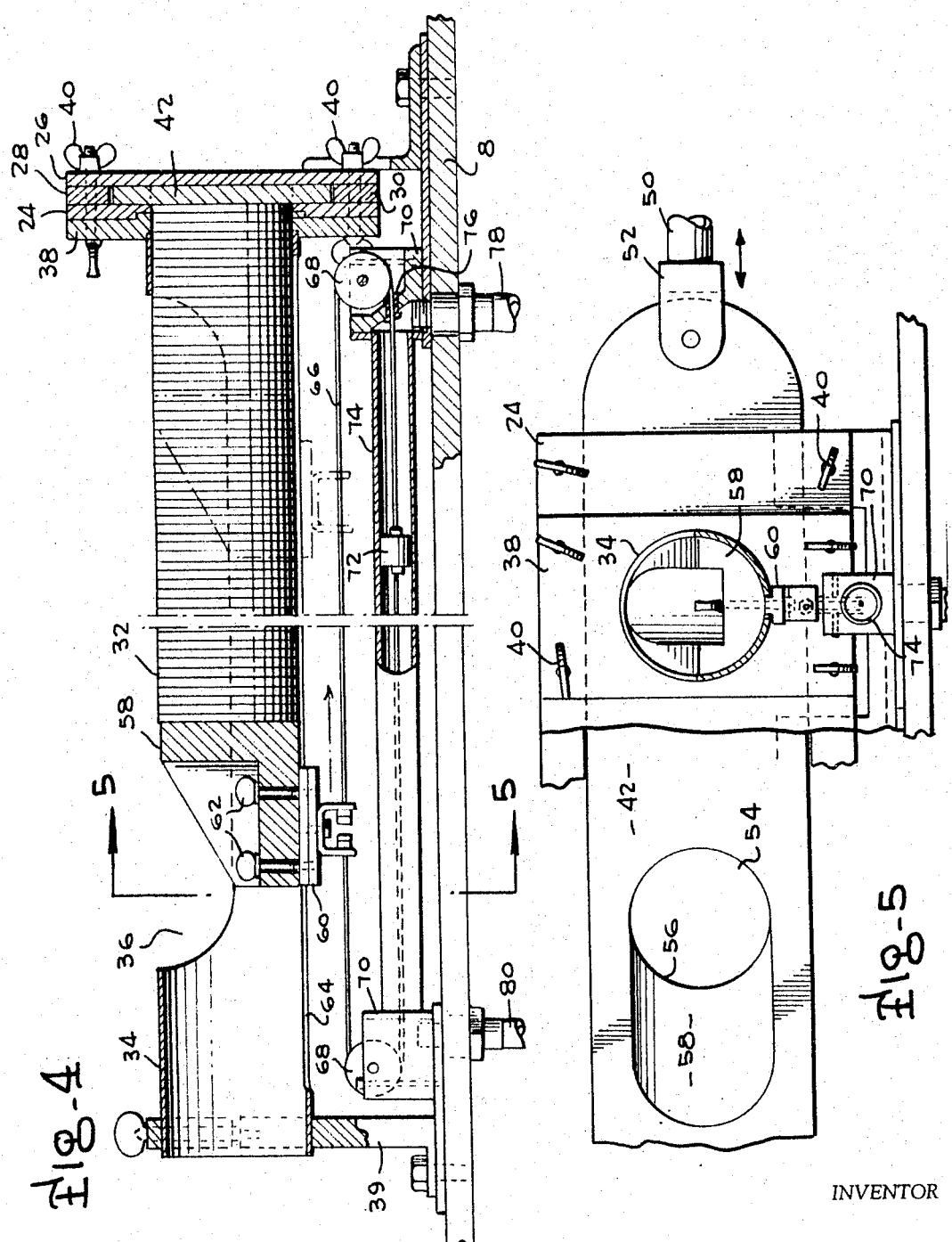

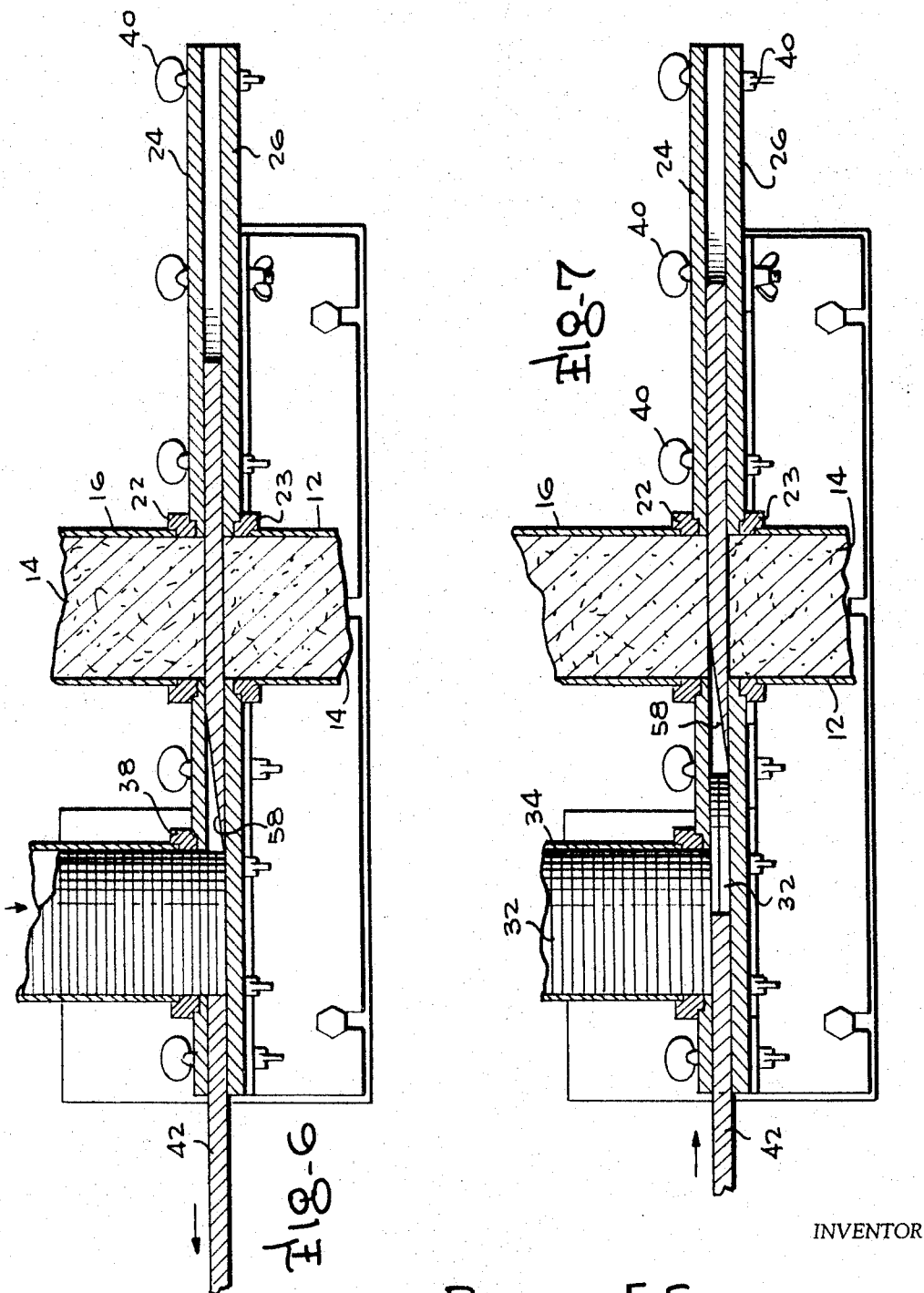

3,462,793
APPARATUS FOR PROVIDING STUFFED FOOD CASINGS HAVING FLATTENED ENDS
Richard F. Sumption, Portsmouth, Va., assignor to Gwaltney Incorporated, Smithfield, Va., a corporation of Virginia
Filed June 6, 1967, Ser. No. 643,906
Int. Cl. A22c 7/00, 11/00; B60b 55/00
U.S. Cl. 17—32                                10 Claims

ABSTRACT OF THE DISCLOSURE

An apparatus and method for forming stuffed food products by insertion of pairs of separator elements in a tubular extrusion mold to separate ground food products being extruded from the mold into discrete batches in elongated form with flattened ends for insertion into discrete casings.

BACKGROUND OF THE INVENTION

This invention relates to the field of food products and more specifically, to the field of machines and methods for providing stuffed products having flattened ends.

It is well known that most stuffed food products are in the form of a generally cylindrical central portion having tapered crinkled ends as a result of tieing or clamping of the ends of the casing to retain the stuffing therein. Such food products stuffing can be in the form of raw, smoked or cooked meat, sausage, pudding, dairy products or the like. The crinkled end portions of such stuffed casing food products are not aesthetically appealing and are additionally undesirable since the food product contained within such cannot be sliced to provide slices of unitary sizes. This problem is of particular concern to restaurants and the like wherein the wastage of the food product in the tapered end portions can result in considerable economic loss.

The need for stuffed casing food products of constant diameter is recognized in U.S. Patent No. 2,886,073 which discloses a small manually operated apparatus for providing such packages. However, the device of said patent, while providing a satisfactory product, is slow in operation and requires a number of manual operations for each product produced. This invention, on the other hand, provides the means for automatically rapidly forming such constant diameter stuffed casing food products with a minimum of manual operation and maximum efficiency. The invention provides both an apparatus and method in which a constant flow or a rapidly cycled intermittent flow of comminuted food product is maintained to rapidly fill casings without undue interruption, as opposed to the batch type operation of the aforementioned patent.

SUMMARY OF THE INVENTION

It is the object of this invention to provide a new and improved apparatus and method for forming stuffed casing food products.

Achievement of the object of this invention is enabled in a preferred manner by the provision of an elongated tubular hollow mold member into which comminuted food products are continuously or intermittently introduced from a supply conduit or the like for passage through the hollow tube and subsequent extrusion into discrete casings. A feed means removes a pair of flat substantially ridged separator elements from a storage magazine for insertion into the hollow tubular mold at desired time intervals. Each pair of separator elements serves to divide the food product in the mold into discrete batches which are separated upon extrusion from the mold member. A magazine is provided for storing the separator elements prior to their extrusion into the mold.

BRIEF DESCRIPTION OF THE DRAWINGS

FIGURE 1 is a perspective view of the preferred embodiment for practicing the invention;

FIGURE 2 is an elevational view of the infeed side of the device illustrated in FIGURE 1;

FIGURE 3 is a sectional view taken along lines 3—3 of FIGURE 2;

FIGURE 4 is a sectional view taken along lines 4—4 of FIGURE 2;

FIGURE 5 is a sectional view taken along lines 5—5 of FIGURE 4 with portions of the structure removed for clarity;

FIGURE 6 is a sectional view similar to FIGURE 3 but illustrating certain operative parts in different positions; and FIGURE 7 is a sectional view similar to FIGURE 6 but illustrating the operative parts in yet another position.

DESCRIPTION OF THE PREFERRED EMBODIMENT

FIGURE 1 illustrates a preferred device for practicing the invention. The preferred device comprises a plurality of components on a support surface or frame 8 and includes a supply means comprising an infeed conduit 12 through which comminuted or ground food products 14 such as meat, for example, is forcefully fed by any suitable means to a hollow mold in the form of a tube 16 having an infeed opening 18 (FIG. 3) and an outfeed extrusion opening 20. Tube 16 is coaxial with infeed conduit 12 as shown in FIGURE 3 and tube 16 and infeed conduit 12 are connected to first and second rectangular attaching plates 22 and 23 respectively which clampingly embrace first and second guide plates 24 and 26 respectively. An upper spacer plate 28 and a lower spacer plate 30 maintain guide plates 24 and 26 in fixed spaced relationship as shown in FIGURES 1 and 4.

Storage of a plurality of separator elements 32 is effected by a tubular magazine 34 having an elongated opening 36 along its upper side and which is attached at one end to guide plate 24 by means of a third rectangular attaching plate 38 as shown in FIGURE 1. The other end of magazine 34 is supported by a bracket 39 attached to support surface 8. Guide plates 24, 26, and spacer plates 28, 30 are maintained in fixed position with respect to each other by readily disconnectable thumb bolt and nut assemblies 40 which also serve to retain the attaching plates 22, 23 and 38 in fixed position. Elements 24, 26, 28 and 30 are connected to provide an interior rectangular open space in which a reciprocable feed plate 42 is mounted for reciprocation by an air cylinder 44. Air cylinder 44 is mounted on a bracket 48 which is attached to supporting surface 8 in any convenient manner. Cylinder 44 includes a piston having a rod 50 extending outwardly in known manner and connected to reciprocable feed plate 42 by means of clevis 52.

Reciprocable feed plate 42 has a circular opening 54 extending completely therethrough in an interior portion thereof. However, it should be noted that it is sometimes necessary that one half of opening 54 includes a knife edge 56 formed at the intersection of a tapered portion 58 and opening 54 as shown in FIGURES 5, 6, and 7. However, in some instances it is not necessary to employ a knife edge for certain products. Reciprocable feed plate 42 is movable from a first position in which circular opening 54 is aligned with the end of tubular magazine 34 to a second position in which the circular opening 54 is aligned with and coaxial with infeed conduit 12 and hollow mold tube 16. The first position of reciprocable feed plate 42 is illustrated in FIGURE 6 and the second position is illustrated in FIGURE 3 with FIGURE 7 illustrating an intermediate position.

The stack of separator elements 32 maintained within tubular magazine 34 is constantly biassed in the direction of reciprocable plate 42 by bias block 58 which is best illustrated in FIGURE 4. A bracket 60 is attached to bias block 58 by thumb screws 62 and extends downwardly through a longitudinal slot 64 extending along the length of tubular magazine 34. Movement is imparted to bias block 58 by a cord 66 which is circular in cross-section and extends over pulleys 68 mounted for rotation on head brackets 70. Cord 66 is connected to free floating piston 72 mounted for reciprocation in a cylinder 74 which is attached at either end to head brackets 70. Cord 66 extends through airtight seal 76 on each head bracket and is freely movable within seal 76. Pressurized air from a conduit 78 is introduced into the right end of cylinder 76 to urge piston 72 to the left and consequently urge block 58 to the right so that separator elements 32 are biassed toward reciprocable plate 42 in an obvious manner. When the bias block 58 moves to the vicinity of the dotted line position thereof illustrated in FIGURE 4, pressurized air is introduced through a second conduit 80 and conduit 78 is exhausted to cause piston 72 to move to the right and consequently move block 58 to an extreme leftmost position to enable refilling of tubular magazine 34.

In operation, comminuted food is continuously or intermittently introduced through infeed conduit 12 and passed through mold tube 16 to be extruded from opening 20 into casing C having a diameter which enables the open end of the casing to be fitted over the outer periphery of tubular mold 16. A separator element 32 is shown in the closed and filled end of casing C as illustrated in FIGURE 1. While casing C is being filled, reciprocable feed plate 42 is maintained in the position illustrated in FIGURE 3 so that a continuous supply of food product can be introduced into tubular mold 16. However, cylinder 44 is actuated at desired time intervals to move plate 42 from the position illustrated in FIGURE 3 to the position illustrated in FIGURE 6. When plate 42 assumes the position illustrated in FIGURE 6, bias block 58 is moved so that the two separator elements 32 nearest plate 42 are moved into opening 54 as shown in FIGURE 6. The thickness of plate 42 is such that only two separator elements are accommodated within opening 54. The movement of plate 42 from its FIGURE 3 position to its FIGURE 6 position causes cutting edge 56 to slice through the food product 14 located in the path of movement of the cutting edge and the tapered surface 58 forces the food product in its path of movement into tubular mold 16. It will be easily seen that the particular structure of plate 42 results in opening 54 being substantially empty when it is moved to its FIGURE 6 position.

Reciprocable plate 42 is then moved to the right through the position shown in FIGURE 7 and carries the pair of separator elements 32 with it. Continued movement of plate 42 positions separator elements 32 coaxially with empty conduit 12 and tubular mold 16. Since the separator elements 32 are of slightly less diameter than the interior of tubular mold 16, the continued movement of food product 14 from conduit 12 forces the pair of separator elements into tubular mold 16 for movement therethrough as shown in FIGURE 3. The pair of separator elments 32 illustrated in FIGURE 3 effectively separates the food product into different batches. As pair 32′ approaches opening 20, casing C is substantially full and the casing is removed with the forward separator element 32F within its interior but with the rear separator element 32R remaining in tubular mold 16. Since the separator elements have a natural adhesion to the food product which is greater than their mutual adhesion, the separation of the forward and rearward separator elements is easily achieved. Another casing is then inserted over tubular mold 16 and the rearward separator element 32R is moved into the forward end of the casing in the position of separator element 32 as illustrated in FIGURE 1. The casing which was removed from the tubular mold is then closed by conventional means on its open end to provide the finished food product package 82 having flattened ends as shown in FIGURE 1. The foregoing steps are repeated in accordance with the number of packages desired to be prepared. It should be noted that the entire device is easily disassembled for cleaning by the simple expedient of loosening the bolt and nut assemblies 40.

It should be understood that the foregoing disclosure relates solely to a preferred embodiment for practicing the invention and that numerous modifications and alterations may be made therein without departing from the spirit and scope of the invention as set forth in the appended claims. For example, other electrical or mechanical means could be employed in place of cylinder 44 and cylinder 74 for performing their respective functions.

What is claimed is:

1. An apparatus for forming elongated products having flat ends and being stuffed in casings, said apparatus comprising:
   a hollow mold member having an infeed opening and an outfeed opening;
   supply means connected to said infeed opening substantially continuously supplying comminuted food products to the interior of said mold member so that a molded food product is substantially continuously extruded from the outfeed opening of said mold member into a casing positioned adjacent said outfeed opening to fill said casing with said food product; and
   feed means for cyclically positioning substantially rigid flat separator elements adjacent said infeed opening which separator elements subsequently progress through said mold into said casings to form stuffed casings having one of said separator elements inside each end of said casings to provide a resultant food product having flattened ends.

2. The device of claim 1 wherein said infeed means comprises means for simultaneously positioning two of said separator elements in abutting relationship with each other adjacent said infeed opening so that one of said separator elements provides a rearward termination of a food product mass to be inserted in a casing and the other of said elements provides a forward termination of the front of another food product mass to be inserted in a next subsequent casing.

3. The device of claim 2 wherein said feed means includes a reciprocable element movable from a first position wherein said reciprocable element receives two of said flat separator elements from a magazine to a second position where said two separator elements are positioned adjacent said infeed opening for movement into said mold.

4. The device of claim 3 wherein said reciprocable means includes a reciprocable feed plate mounted for reciprocation between first and second guide plates with said reciprocable plate having an opening for receiving two of said separator elements and being of a thickness substantially equal to the combined thickness of said two of said separator elements and wherein said magazine comprises a tubular element including biasing means for continuously biasing a plurality of said separator elements contained within said tubular element toward said reciprocable plate so that movement of said reciprocable plate to said first position positions said opening in said reciprocable plate adjacent the endmost separator element in said tubular member so that two of said separator elements can be moved into said opening in said reciprocable plate to enable subsequent movement of said two separator elements to said position adjacent said infeed opening.

5. The device of claim 4 wherein said hollow mold member is an elongated tube and said casings are substantially cylindrical in shape and have a diameter slightly greater than the exterior diameter of said hollow mold tube so that said casings can be fitted over said tube to receive food products extruded therefrom.

6. The device of claim 5 wherein said tubular mold member is attached to said first guide plate coaxially with an opening in said first guide plate and said supply means comprises a tube coaxial with said tubular mold and is connected to said second guide plate coaxially with an opening in said seocnd guide plate so that said reciprocable plate is movable to a position betwegen said hollow tube mold and said supply tube with said opening in said reciprocable plate assuming a position coaxial with said tube when said reciprocable plate is in said reciprocable plate's position to enable comminuted food product to pass from said supply tube through said opening in said reciprocable plate into said infeed opening.

7. The device of claim 4 wherein said opening in said reciprocable plate is circular in shape and has a diameter slightly greater than the diameter of said separator elements and also includes a knife edge along one half of said opening for slicing through said food products when said reciprocable plate moves from said reciprocable plate's second position to said reciprocable plate's first position.

8. The device of claim 7 wherein said reciprocable plate includes a gradually tapered portion extending longititudinally away from said knife edge.

9. In an apparatus of the type including extrusion means for extruding a comminuted food product into elongated casings, the improvement comprising:
means for simultaneously inserting pairs of flat separator elements into said extrusion means for extrusion therefrom into said casings at desired intervals to enable obtainment of a product having flattened non-tapered ends,
wherein said extrusion means comprises an elongated tubular mold and said separator element inserting means includes means for removing a pair of said separator elements from a storage magazine and subsequently inserting said separator elements into said elongated tubular mold.

10. The device of claim 9 wherein said separator element insertion means comprises a reciprocable plate having a circular opening therein which in a first position is aligned with said magazine and which in a second position is aligned with said tubular mold and which includes a semi-circular knife edge portion.

References Cited

UNITED STATES PATENTS

| | | | |
|---|---|---|---|
| 2,099,638 | 11/1937 | Wiley | 17—32 |
| 2,669,749 | 2/1954 | Houland | 17—35 |
| 2,717,415 | 9/1955 | Gerhart | 17—32 |
| 2,886,073 | 5/1959 | Beck | 141—313 |
| 2,912,924 | 11/1959 | Dahl et al. | 17—32 X |
| 3,233,281 | 2/1966 | Swift | 17—35 X |
| 3,283,361 | 11/1966 | Sommer | 17—38 |

LUCIE H. LAUDENSLAGER, Primary Examiner

U.S. Cl. X.R.

17—34; 53—123; 99—174; 141—313